US010217456B2

(12) United States Patent
Ichikawa et al.

(10) Patent No.: US 10,217,456 B2
(45) Date of Patent: Feb. 26, 2019

(54) METHOD, APPARATUS, AND PROGRAM FOR GENERATING TRAINING SPEECH DATA FOR TARGET DOMAIN

(71) Applicant: INTERNATIONAL BUSINESS MACHINES CORPORATION, Armonk, NY (US)

(72) Inventors: Osamu Ichikawa, Kanagawa-ken (JP); Steven J Rennie, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 612 days.

(21) Appl. No.: 14/251,772

(22) Filed: Apr. 14, 2014

(65) Prior Publication Data
US 2014/0337026 A1 Nov. 13, 2014

(30) Foreign Application Priority Data

May 9, 2013 (JP) .................................. 2013-099645

(51) Int. Cl.
| | | |
|---|---|---|
| *G10L 15/00* | (2013.01) | |
| *G10L 15/06* | (2013.01) | |
| G10L 15/14 | (2006.01) | |
| G10L 15/07 | (2013.01) | |

(52) U.S. Cl.
CPC .......... *G10L 15/063* (2013.01); *G10L 15/075* (2013.01); *G10L 15/14* (2013.01)

(58) Field of Classification Search
CPC ...... G10L 15/063; G10L 15/075; G10L 15/14
(Continued)

(56) References Cited

U.S. PATENT DOCUMENTS

2006/0053014 A1* 3/2006 Yoshizawa ............... G10L 15/06
 704/256.4
2007/0239441 A1* 10/2007 Navratil .................. G10L 17/20
 704/225

(Continued)

FOREIGN PATENT DOCUMENTS

| JP | H05-073088 A | 3/1993 |
|---|---|---|
| JP | 10-149191 A | 6/1998 |

(Continued)

OTHER PUBLICATIONS

Droppo et al., "Evaluation of the SPLICE Algorithm on the Aurora2 Database", Mircosoft Research, Proc. of Eurospeech, 2001, pp. 217-220, 2001.

(Continued)

*Primary Examiner* — Thierry L Pham
(74) *Attorney, Agent, or Firm* — Rabin Bhattacharya, Esq.; McGinn IP Law Group, PLLC

(57) ABSTRACT

A method and system for generating training data for a target domain using speech data of a source domain. The training data generation method including: reading out a Gaussian mixture model (GMM) of a target domain trained with a clean speech data set of the target domain; mapping, by referring to the GMM of the target domain, a set of source domain speech data received as an input to the set of target domain speech data on a basis of a channel characteristic of the target domain speech data; and adding a noise of the target domain to the mapped set of source domain speech data to output a set of pseudo target domain speech data.

20 Claims, 5 Drawing Sheets

(58) Field of Classification Search
USPC .................................................. 704/243, 255
See application file for complete search history.

(56) References Cited

U.S. PATENT DOCUMENTS

| | | | | |
|---|---|---|---|---|
| 2007/0239634 | A1* | 10/2007 | Tian | G10L 13/033 706/15 |
| 2010/0318354 | A1* | 12/2010 | Seltzer | G10L 15/063 704/233 |
| 2011/0191101 | A1* | 8/2011 | Uhle | G10L 21/0208 704/205 |
| 2011/0251843 | A1* | 10/2011 | Aronowitz | G10L 17/02 704/235 |
| 2012/0041764 | A1* | 2/2012 | Xu | G10L 15/065 704/256.1 |

FOREIGN PATENT DOCUMENTS

| | | |
|---|---|---|
| JP | 2002-529800 A | 9/2002 |
| JP | 2005-196020 A | 7/2005 |
| JP | 2008-026489 A | 2/2008 |
| JP | 2012-042957 A | 3/2012 |

OTHER PUBLICATIONS

Stahl et al., "Acoustic Synthesis of Training Data for Speech Recognition in Living Room Environments," Philips Research Lab, Proc. of ICASSP, vol. 1, 2001, pp. 285-288, 2001.

Moreno et al., "A Vector Taylor Series Approach for Environment—Independent Speech Recognition", Proc. of ICASSP, 1996, vol. 2, pp. 733-736, IEEE 1995.

Seltzer et al., "Factored Adaptation for Separable Compensation of Speaker and Environmental Variability", Microsoft Research, Proc. of ASRU, 2011, pp. 146-151, IEEE, 2011.

Gales, M.J.F., "Maximum Likelihood Linear Transformations for HMM Based Speech Recognition", Computer Speech and Language, 1998, vol. 12, pp. 75-98, May 1997.

Gales et al., "Robust Continuous Speech Recognition Using Parallel Model Combination", IEEE Trans. on Speech and Audio Proc., Sep. 1996, vol. 4, No. 5 pp. 352-359, 1996.

Kingsbury et al., "FMPE: Discriminatively Trained Features for Speech Recognition", IBM T.J. Watson Research Center, Proc. ICASSP, 2005, vol. 1, pp. 961-964, 2005.

Atsunori et al., "Experimental Analyses of Cepstral Coefficient Normalization Units", IEICE Transactions on Information & Systems, Sep. 2007, vol. J90-D No. 9, pp. 2648-2651.

Cincarek et al., "Utterance-based Selective Training for the Automatic Creation of Task-Dependent Acoustic Models", IEICE Trans. Information & Systems, Mar. 2006, vol. E89-D No. 3, pp. 962-969, 2006.

Raj et al., "Cepstral Compensationusing Statistical Linearization", Proc. of the ETRW, 1997.

Kim et al., "Speech recognition in noisy environments using first-order vector Taylor series", Speech Communication, 1998, vol. 24, pp. 39-49, Elsevier Science B.V. 1998.

Japanese Office Action dated Dec. 6, 2016, with an English translation.

* cited by examiner

Figure 5

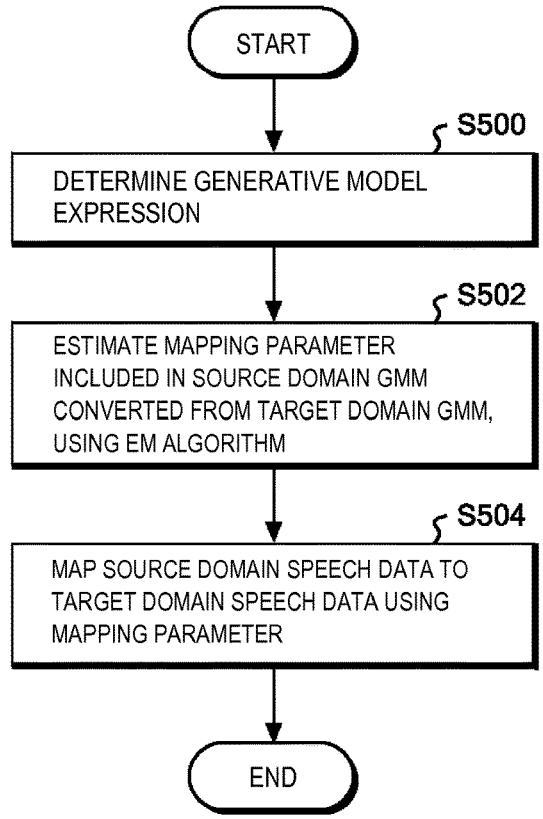

Figure 6

| | TRAINING DATA | EVALUATION DATA | CMN off | CMN on |
|---|---|---|---|---|
| A | REMOTE MICROPHONE, IDLING | REMOTE MICROPHONE, IDLING (FAN OFF; WINDOW CLOSED) | 99.7 | 99.7 |
| B | CLOSE-TALKING MICROPHONE, IDLING | REMOTE MICROPHONE, IDLING (FAN OFF; WINDOW CLOSED) | 92.3 | 95.2 |
| C | CLOSE-TALKING MICROPHONE, IDLING, WITH CHANNEL MAPPING (ONLY BIAS) | REMOTE MICROPHONE, IDLING (FAN OFF; WINDOW CLOSED) | 93.1 | 96.0 |
| D | CLOSE-TALKING MICROPHONE, IDLING, WITH CHANNEL MAPPING (GENDER-DEPENDENT; ONLY BIAS) | REMOTE MICROPHONE, IDLING (FAN OFF; WINDOW CLOSED) | 94.5 | 96.8 |
| E | CLOSE-TALKING MICROPHONE, IDLING, WITH CHANNEL MAPPING (GENDER-DEPENDENT; BIAS AND AMPLITUDE) | REMOTE MICROPHONE, IDLING (FAN OFF; WINDOW CLOSED) | 96.4 | 98.0 |

METHOD, APPARATUS, AND PROGRAM FOR GENERATING TRAINING SPEECH DATA FOR TARGET DOMAIN

CROSS-REFERENCE TO RELATED APPLICATION

This application claims priority under 35 U.S.C. § 119 from Japanese Patent Application No. 2013-099645 filed May 9, 2013, the entire contents of which are incorporated herein by reference.

BACKGROUND OF THE INVENTION

1. Field of the Invention

The present invention relates to a technique for generating speech data of a target domain using speech data of a source domain, and more particularly, to a technique for mapping the source domain speech data on the basis of the channel characteristic of the target domain speech data.

2. Description of the Related Art

The performance of speech recognition significantly depends on the acoustic environment of a target domain. That is, if there is an acoustic mismatch between an environment for learning an acoustic model and an environment for evaluating speech, the performance of a speech recognition system deteriorates in many cases. The mismatch between the environments increases due to various causes such as background noises, the acoustic characteristic of a recording apparatus, and channel distortion. Therefore, conventionally, a great amount of time and labor has been spent to record speech data in a particular environment in order to avoid the mismatch between the environments from being caused by constructing an acoustic model of a target domain.

In contrast thereto, it has become possible to acquire a large amount of live speech data at a low cost due to the Internet services (for example, speech search and voice mail) using a handheld device such as a smartphone in recent years. Therefore, there is a demand for reusing abundant speech data in such various acoustic environments.

Traditionally, approaches for the cross domain problem in speech recognition are roughly classified into the following four:
1. Reuse method
2. Model adaptation method
3. Feature value conversion method
4. Normalization method The reuse method of 1. is a method of, in order to construct an acoustic model of a target domain, simulating target domain speech data using source domain speech data (for example, see Non-patent Literatures 1 ("Acoustic Synthesis of Training Data for Speech Recognition in Living Room Environments") and 2 ("Evaluation of the SPLICE Algorithm on the Aurora2 Database")).

The model adaptation method of 2. is a method of changing a parameter of an acoustic model of a source domain to adapt it to test speech, and Maximum A Posteriori Estimation (MAP) and Maximum Likelihood Linear Regression (MLLR) correspond thereto (for example, see Patent Literature 1 (JP2012-42957A) and Non-patent Literatures 3 ("A vector Taylor series approach for environment-independent speech recognition"), 4 ("Factored Adaptation for Separable Compensation of Speaker and Environmental Variability"), and 5 ("Maximum likelihood linear transformations for HMM based speech recognition")). As techniques for adapting a model similarly, Patent Literatures 2 (JP2002-529800A) and 3 (JP10H-149191A) and Non-patent Literature 6 ("Robust continuous speech recognition using parallel model combination") exist though they are different from the above method.

The feature value conversion method of 3. is a method of converting the feature value of test speech to adapt it to an acoustic model of a source domain at the time of decoding, and Feature Space Maximum Likelihood Linear Regression (fMLLR) and Feature Space Minimum Mutual Information (fMMI) correspond thereto (for example, see Non-patent Literatures 3 to 5, and 7 ("fMPE: Discriminatively Trained Features for Speech Recognition")).

The normalization method of 4. is a method of normalizing distribution of feature values of test speech to adapt it to an acoustic model of a source domain, and Cepstral Mean Normalization (CMN) and Mean and Variance Normalization (MVN) correspond thereto (for example, see Non-patent Literature 8 ("Experimental Analyses of Cepstral Coefficient Normalization Units")).

These methods of 1. to 4. can be combined for use. The methods of 2. to 4. are techniques already established. On the other hand, though the method of 1. is an important technique as a starting point of all the processes, existing techniques belonging to the method cannot be applied to speech data collected via the Internet which has been described above.

Non-patent Literature 1 discloses a method of convoluting an impulse response at a target domain first, with clean speech of a source domain as an input and, after that, adding noise to simulate speech of the target domain (see FIG. 2A). Though this method is the most direct method for compensating channel and noise characteristics, the method is not appropriate when speech data on the Internet is source data. This is because the source data cannot be said to be clean speech, and the channel characteristic of input data is too varied for a single impulse response.

Non-patent Literature 2 discloses a mapping method using stereo data. That is, the technique of Non-patent Literature 2 requires simultaneous recording of source domain speech data and target domain speech data. When speech data to be a source is live data on the Internet, it is difficult to prepare stereo data, and therefore the method cannot be used.

Certain literature discloses a technique of constructing speech corpus of a target task by selecting speech data corresponding to the target task from existing speech corpus (see Non-patent Literature 9 ("Utterance-based Selective Training for the Automatic Creation of Task-Dependent Acoustic Models")).

Non-patent Literatures 10 ("Cepstral compensation using statistical linearization") and 11 ("Speech recognition in noisy environments using first-order vector Taylor series") are enumerated as background art showing a technique of calculating, from a Gaussian mixture model (GMM) of clean speech prepared in advance and a relational expression between the clean speech and observed speech, a GMM of the observed speech by the Vector Taylor Series (VTS) approximation.

BRIEF SUMMARY OF THE INVENTION

The present invention provides a method for generating training data for a target domain using speech data of a source domain, the training data generation method including: reading out a Gaussian mixture model (GMM) of a target domain trained with a clean speech data set of the target domain; mapping, by referring to the GMM of the target domain, a set of source domain speech data received as an input to the set of target domain speech data on a basis of a channel characteristic of the target domain speech data; and adding a noise of the target domain to the mapped set of source domain speech data to output a set of pseudo target domain speech data.

Another aspect of the present invention provides a system for generating training data for a target domain using a set of speech data of a source domain, the training data generation system including: a memory; a processor communicatively coupled to the memory; and a feature selection module communicatively coupled to the memory and the processor, wherein the feature selection module is configured to perform the steps of a method including: reading out a Gaussian mixture model (GMM) of a target domain trained with a clean speech data set of the target domain; mapping, by referring to the GMM of the target domain, a set of source domain speech data received as an input to the set of target domain speech data on a basis of a channel characteristic of the target domain speech data; and adding a noise of the target domain to the mapped set of source domain speech data to output a set of pseudo target domain speech data.

BRIEF DESCRIPTION OF THE DRAWINGS

FIG. 5 is a flowchart showing an example of the flow of a mapping process according to embodiments of the present invention.

FIG. 6 is a diagram showing a result of a speech recognition experiment conducted with the use of an acoustic model constructed from training speech data generated by applying an embodiment of the present invention.

DETAILED DESCRIPTION OF THE PREFERRED EMBODIMENTS

Figure 1:
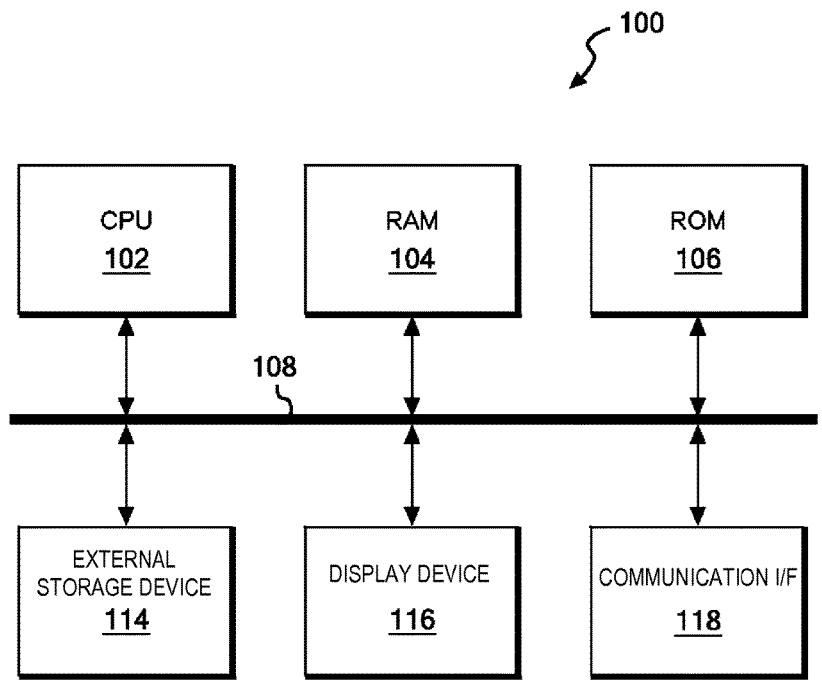
FIG. 1 shows an example of a hardware configuration of an information processing apparatus preferred for realizing a training speech-data generation system according to an embodiment of the present invention.

The present invention has been made in view of the problems of the conventional techniques described above, and the object thereof is to provide a method, apparatus, and program for simulating speech data of a target domain by reusing abundantly existing speech data under different acoustic environments like speech data on the Internet.

The invention as claimed in the application concerned provides a method for generating speech data having the following features in order to solve the problems of the conventional techniques described above. A speech data generation method of the invention as claimed in the application concerned includes the steps of: reading out a Gaussian mixture model (GMM) of the target domain trained with clean speech data of the target domain; referring to the target domain GMM and mapping the source domain speech data received as an input to the target domain speech data on the basis of the channel characteristic of the target domain speech data; and adding noise of the target domain to the mapped source domain speech data to output pseudo target domain speech data. Here, the amount of the clean speech data of the target domain used for training of the target domain GMM can be small.

Preferably, the mapping step includes the steps of: determining a generative model expression for mapping the source domain speech data to the target domain speech data by a channel mapping parameter; and estimating a channel mapping parameter included in a source domain GMM converted from the target domain GMM by referring to the generative model expression, using an Expectation Maximization (EM) algorithm.

Preferably, the channel mapping parameter includes a channel bias to be subtracted from the source domain speech data in order to determine the pseudo target domain speech data.

More preferably, the channel mapping parameter further includes a channel amplitude by which the source domain speech data is to be multiplied, in order to determine the pseudo target domain speech data.

Preferably, the step of performing estimation using the EM algorithm includes a step of alternately repeating a step of determining acoustic likelihood obtained by inputting an observed value of the source domain into the converted source domain GMM and a step of determining the channel mapping parameter that minimizes an objective function based on the determined acoustic likelihood.

More preferably, a noise component calculated on the basis of the channel mapping parameter currently estimated is referred to in the step of determining the acoustic likelihood.

More preferably, the Vector Taylor Series (VTS) approximation is used at the time of determining the source domain GMM converted from the target domain GMM by referring to the generative model expression.

Preferably, the Gaussian mixture model (GMM) of the target domain trained is prepared for each gender of speakers, and mapping to the target domain speech data is performed while masculinity and femininity is determined for each utterance of the source domain speech data received as an input.

Furthermore, preferably, the mapping step includes a step of determining, for each source domain speech data, a difference from an average of Gaussian distribution components which are near to the speech data in an acoustic space, among Gaussian distribution components of the target domain GMM, determining the difference as a time-direction average after weighting the difference with the likelihood of each Gaussian distribution component, and adding the difference to the source domain speech data.

The present invention has been described as a method for generating training speech data for a target domain. However, the present invention can be also grasped as a training speech-data generation program causing a computer to execute each step of such a training speech-data generation method, and a training speech-data generation system realized by installing the training speech-data generation program in one or more computers.

According to the invention as claimed in the application concerned, a target domain GMM trained with clean speech data is referred to, and source domain speech data received as an input is mapped to target domain speech data on the basis of the channel characteristic of the target domain speech data to simulate target domain speech data. Therefore, for both speeches, it is unnecessary that transcription data exists, and it is also unnecessary to perform speech recognition. It becomes possible to reuse abundantly existing speech data under different acoustic environments like speech data on the Internet to simulate target domain speech data. Other advantages of the present invention will be understood from the description of each embodiment.

An embodiment for practicing the present invention as claimed in the application concerned will be described below in detail on the basis of drawings. However, the embodiments described below do not limit the invention according to claims. Furthermore, all the combinations of features described in the embodiments are not necessarily indispensable for solution means of the invention. The same elements are given the same reference numerals through the whole description of the embodiment.

FIG. 1 shows an exemplary hardware configuration of a computer 100 for practicing the present invention. An external storage device 114 and a ROM 106 can give an instruction to a CPU 102 in cooperation with an operating system to record codes of multiple computer programs for practicing the present invention and various data. By being loaded to a RAM 104, each of the multiple computer programs stored in the external storage device 114 and the ROM 106 is executed by the CPU 102. The external storage device 114 is connected to a bus 108 via a controller (not shown) such as a SCSI controller. The codes of the multiple computer programs include a training speech-data generation program according to the embodiments of the present invention. The various data includes speech data under various acoustic environments on the Internet to be source domain speech data in the present invention and a target domain GMM trained with a small amount of clean speech data of a target domain.

The computer programs can be compressed, or divided into multiple parts and recorded in multiple media. The details of a process the CPU 102 performs for a digital signal handed over from the external storage device 114, by the training speech-data generation program will be described later.

The computer 100 also includes a display device 116 for presenting visual data to a user. The display device 116 is connected to the bus 108 via a graphics controller (not shown). The computer 100 can connect to a network via a communication interface 118 to communicate with other computers or the like.

From the above description, it will be easily understood that the computer 100 is realized by an information processing apparatus such as a common personal computer, a workstation and a mainframe, or a combination thereof. The components described above are shown merely as examples, and all the components are not necessarily indispensable components of the present invention. Similarly, it goes without saying that the computer 100 for practicing the present invention can include other components such as an input device like a keyboard and a mouse, and a speaker.

Figure 2A:
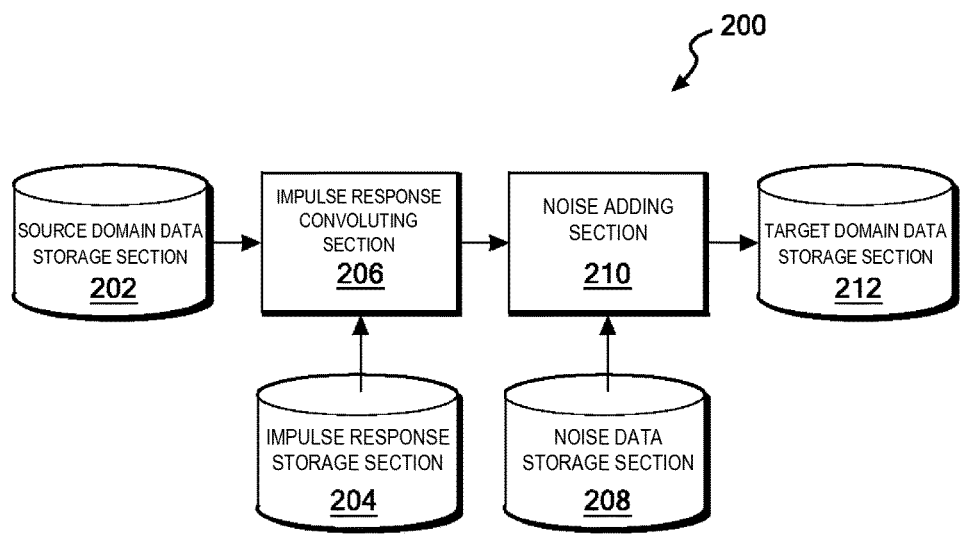
FIG. 2A is a functional block diagram of a conventional system for simulating training speech data according to embodiments of the present invention.
Figure 2B:
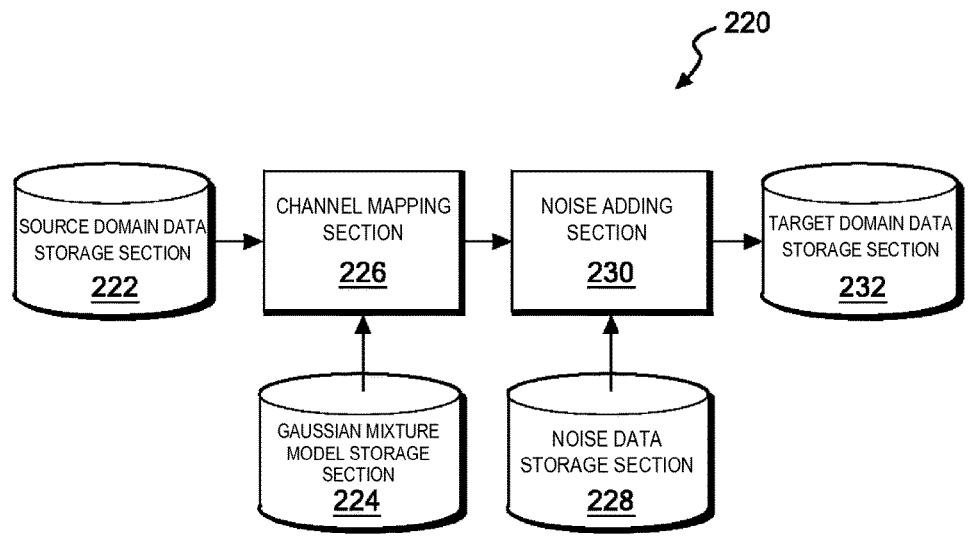
FIG. 2B is a functional block diagram of the training speech-data generation system according to embodiments of the present invention.

FIG. 2B is a functional block diagram of a training speech-data generation system 220 according to the embodiment of the present invention. The training speech-data generation system 220 is provided with a source domain data storage section 222, a Gaussian mixture model storage section 224, a channel mapping section 226, a noise data storage section 228, a noise adding section 230 and a target domain data storage section 232 in order to map source domain speech data to target domain speech data to pseudo-generate target domain speech data.

The source domain data storage section 222 stores abundant speech data under various acoustic environments which are published on the Internet or provided by services such as speech search services using the Internet, as source domain speech data. Therefore, there is a strong possibility that some noise is superimposed on the source domain speech data. Such collection of speech data using the Internet is performed, for example, by implementing an application program for performing speech recognition on a mobile terminal and utterance by its user being transmitted via the Internet and accumulated in a server.

The Gaussian mixture model storage section 224 stores the target domain GMM trained with clean speech data of the target domain. That is, the clean speech data of the target domain is modeled as a k mixture GMM. The target domain GMM training is performed with the use of an EM algorithm. As for the clean speech of the target domain used for the training, a small amount of clean speech is sufficient (for example, speech of several or dozens of male and female speakers corresponding to a total of several hours, or corresponding to less time depending on the accuracy).

For each utterance of source domain speech data read out from the source domain data storage section 222 as an input, the channel mapping section 226 determines the amount of compensation, referring to the target domain GMM read out from the Gaussian mixture model storage section 224, and performs mapping to the target domain speech data. More specifically, the channel mapping section 226 determines, for each speech data (for one utterance) of a source domain, a difference from an average of Gaussian distribution components near to the speech data in an acoustic space, among Gaussian distribution components of the target domain GMM, and determine the difference as a time-direction average, after weighting the difference with the likelihood of each Gaussian distribution component. Next, the channel mapping section 226 adds the amount determined as the time-direction average to the source domain speech data as the amount of channel compensation. Further details of the channel mapping process will be described later.

The noise data storage section 228 stores noise which is noise at the target domain and which is mixed into a microphone from a sound source other than speech and additively transforms the waveform of speech data. It is necessary to record the noise at the target domain under the same conditions (the same acoustic environment) as those at the time of training the target domain GMM stored in the Gaussian mixture model storage section 224.

The noise adding section 230 adds noise randomly read out from the noise data storage section 228 to speech data after channel mapping which is outputted from the channel mapping section 226 to simulate target domain speech data. The simulated pseudo target domain speech data is stored into the target domain data storage section 232 after that. The rate of noise to be added is adjusted for each utterance so that the rate corresponds to the statistical distribution of the SN ratio of the target domain in the end.

Figure 3A:
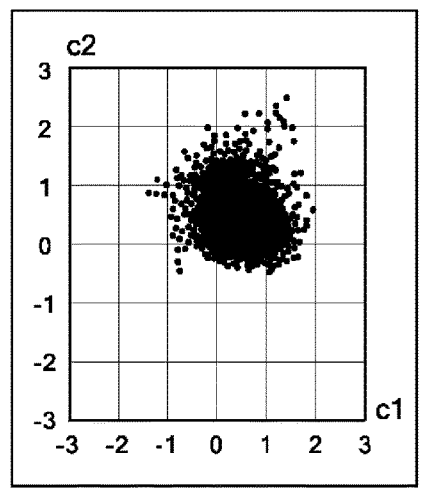
FIG. 3A is a graph showing normalized noise of an automobile.
Figure 3B:
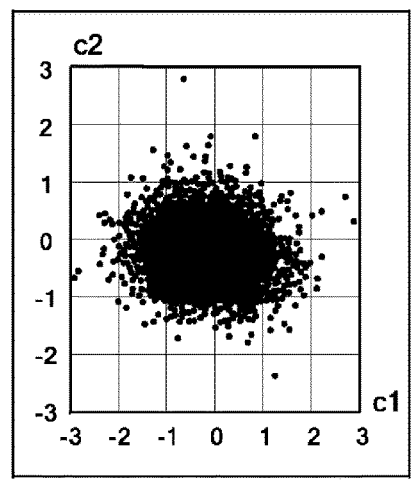
FIG. 3B is a graph showing normalized noise of an automobile.

Thus, the channel characteristic and the noise characteristic are main elements at the time of mapping speech data to the target domain speech data. It is important to perform channel compensation before addition of noise in the training speech-data generation system 220 described above. In order to exemplify this, the same automobile noise is added to two kinds of speech data. Each of FIGS. 3A and 3B shows distribution of noise after CMN processing is performed for each utterance to reduce the effect of channel distortion. The vertical axis indicates c2 (the second cepstrum), and the horizontal axis indicates c1 (the first cepstrum) (the first cepstrum term is Number 0).

FIG. 3A shows distribution of noise after an average value of feature value vectors of speech recorded in a stopped automobile is normalized to 0. FIG. 3B shows distribution of noise after an average value of feature vectors of speech recorded to a portable-type apparatus is normalized to 0. Though the same noise is added, resulting signals are quite different due to runtime channel normalization (CMN) processing. From this result, it is known that it is necessary to perform channel compensation first in order to acquire similar signals in a decoder.

Next, the details of the process by the channel mapping section 226 will be described. In the present invention, the target domain GMM trained with a small amount of clean target domain speech data is used as prior knowledge about the channel characteristic of the target domain. Then, the amount of channel compensation for imitating the target domain GMM (hereinafter referred to as a channel mapping parameter) is determined for each utterance in a large amount of input speech to perform data mapping.

The target domain GMM includes some speaker variation, and it is permitted thereby that a speaker-dependent element is included in an input. Though clean speech on which noise is not superimposed at all is assumed to be preferable as an input, actual speech data includes some noise. Therefore, in embodiments of the present invention, the channel mapping parameter is estimated with the use of VTS approximation and an EM algorithm. Description will be made below on two cases: the case of taking account only of the amount of shift of a feature value (hereinafter referred to as a channel bias) as the channel mapping parameter and the case of taking account of a feature value coefficient for converting the magnitude of a feature value (hereinafter referred to as a channel amplitude) also in addition to the amount of shift of the feature value.

<Case of Taking Account Only of Channel Bias>

Here, description will be made on the case of taking account only of the channel bias in a generative model expression for mapping source domain speech data to the target domain speech data by the mapping parameter. A feature value vector $Y_s$ of observed speech of a source domain in the time domain can be expressed as Expression (1) below using a channel feature value vector $H_s$, a clean speech feature value vector X, a noise feature value vector N (the subscript s indicates being a source domain). Noise which is mixed into a microphone from a sound source other than speech and additively transforms the waveform is indicated by N, and multiplicative distortion added by a transmission system is indicated by H.

[Formula 1]

$$Y_s = H_s \cdot X + N \quad (1)$$

Similarly, a feature value vector $Y_t$ of observed speech of the target domain in the time domain can be expressed as Expression (2) below using a channel feature value vector $H_t$ and the clean speech feature value vector X (the subscript t indicates being a target domain).

[Formula 2]

$$Y_t = H_t \cdot X \quad (2)$$

When Expression (1) above is rewritten in the cepstrum domain, Expressions (3) and (4) below are obtained.

[Formula 3]

$$y_s = h_s + x + G(x + h_s, n) \quad (3)$$

$$G(x,n) = C \log(1 + \exp(C^{-1}(n-x))) \quad (4)$$

Similarly, when Expression (2) above is rewritten in the cepstrum domain, Expression (5) below is obtained. When Expression (5) is further transformed with the use of Expression (3) above, Expressions (8) and (9) below are obtained in the end. Here, c defined by Expression (9) is the channel bias to be determined. Here, the matrix C indicates a Discrete Cosine Transform (DCT) matrix, and C-1 indicates an inverse matrix thereof.

[Formula 4]

$$y_t = h_t + x \quad (5)$$
$$= h_t + (y_s - h_s - G(x + h_s, n)) \quad (6)$$
$$= (h_t - h_s) + y_s - G(x + h_s, n) \quad (7)$$
$$= y_s - c - G(y_t + c, n) \quad (8)$$
$$c = h_s - h_t \quad (9)$$

In Expression (8) above, when the feature value vector $y_t$ of the observed speech of the target domain is rewritten with $\hat{y}$ and the feature value vector $y_s$ of the observed speech of the source domain is rewritten with y, a generative model expression expressed by Expression (10) below is obtained in the end.

[Formula 5]

$$y = \hat{y} + c + G(\hat{y} + c, n) \quad (10)$$

As described above, in the present invention, the channel bias c is estimated with the use of the VTS approximation and the EM algorithm. Specifically, the generative model expression expressed by Expression (10) above is referred to, and the channel bias c included in a source domain GMM converted from the target domain GMM prepared in the Gaussian mixture model storage section 224 in advance is estimated with the use of the EM algorithm. That is, a step of determining acoustic likelihood obtained by inputting the feature vector y of the observed speech of the source domain into the source domain GMM converted from the target domain GMM and a step of determining the channel bias c that minimizes an objective function based on the determined acoustic likelihood are alternately repeated. This repetition step will be described below with the use of expressions.

First, by thinking what is obtained by multiplying what is obtained by taking the logarithm of acoustic likelihood p(y) obtained by inputting the feature value vector y of the observed speech of the source domain into the source domain GMM, by minus, Expression (11) below is obtained. Here, $\gamma_k$, $\mu_{y,k}$ and $\Sigma_{y,k}$ indicate the prior probability, average vector and covariance matrix of the k-th normal distribution of the source domain GMM, respectively. Transformation from Expression (11) to Expression (12) is performed with the use of Jensen's inequality, and Expression (14) is obtained in the end by further transformation being performed. In the Expression below, d indicates the d-th component of the feature value vector y of the observed speech of the source domain, and D indicates the number of dimensions thereof.

[Formula 6]

$$-\log(p(y)) = -\log\left(\sum_k \gamma_k \cdot N\left(y; \mu_{y,k}, \sum_{y,k}\right)\right) \quad (11)$$

$$\leq -\sum_k \gamma_k \cdot \log\left(N\left(y; \mu_{y,k}, \sum_{y,k}\right)\right) \quad (12)$$

$$= -\sum_k \gamma_k \cdot \log\left(\begin{array}{c} \sqrt{2\pi}^{-D} \sqrt{|\sum_{y,k}|}^{-1} \exp \\ \left(-\sum_d^D (y_k - \mu_{y,k,d})^2 / \sum_{y,k,d}\right) \end{array}\right) \quad (13)$$

$$= \text{const} + \sum_k \gamma_k \left\{ \begin{array}{c} \sum_d^D (y_d - \mu_{y,k,d})^2 / \sum_{y,k,d} + \\ \log|\sum_{y,k}|^{\frac{1}{2}} \end{array} \right\} \quad (14)$$

The channel bias c is estimated so that the acoustic likelihood p(y) is maximized. This is equal to estimating the channel bias c so that the second term on the right side of Expression (14) above is minimized. Therefore, an objective function Φ expressed by Expression (15) below is newly introduced.

[Formula 7]

$$\Phi = E\left[\sum_k^K \rho_k(y) \cdot \left\{ \begin{array}{c} \sum_d^D (y_d - \mu_{y,k,d})^2 / \sum_{y,k,d} + \\ \log|\sum_{y,k}|^{\frac{1}{2}} \end{array} \right\}\right] \quad (15)$$

Here, posterior probability p is defined by Expression (16) below.

[Formula 8]

$$\rho_k(y) = \gamma_k \cdot N\left(y; \mu_{y,k}, \sum_{y,k}\right) / \sum_{k'} \gamma_{k'} \cdot N\left(y; \mu_{y,k'}, \sum_{y,k'}\right) \quad (16)$$

The channel bias c is estimated so that the objective function Φ expressed by Expression (15) above is minimized. From the target domain GMM prepared in advance and the generative model expression of Expression (10) above, the source domain GMM is calculated by the VTS approximation on the assumption of a covariance diagonal matrix, and Expressions (17) and (18) below are obtained. An average vector and a covariance matrix of noise are indicated by $\mu_n$ and $\Sigma_{n,d}$, respectively, and Kronecker's delta is indicated by δ.

[Formula 9]

$$\mu_{y,k} \cong \mu_{\hat{y},k} + c + G(\mu_{\hat{y},k} + c, \mu_n) \quad (17)$$

[Formula 10]

$$\sum_{y,k,d} \cong \quad (18)$$

$$\sum_l (\delta_{d,l} - F(\mu_{\hat{y},k} + c, \mu_n)_{d,l})^2 \cdot \sum_{\hat{y},k,l} + \sum_l F(\mu_{\hat{y},k} + c, \mu_n)_{d,l}^2 \cdot \sum_{n,l}$$

The covariance diagonal matrix expressed by Expression (18) can be simplified with further approximation. For example, even if the covariance diagonal matrix is the same as the covariance matrix of the target domain, only little accuracy deterioration occurs. On the contrary, the condition of diagonal approximation can be eliminated to cause the covariance matrix to be a precise one. The vector G appearing in Expression (17) above and the Jacobi matrix F appearing in Expression (18) above are noise components formulized by Expressions (19) and (20) below, respectively. Here, the matrix C indicates a Discrete Cosine Transform (DCT) matrix, and $C^{-1}$ indicates an inverse matrix thereof.

[Formula 11]

$$G(x, n) = C\log(1 + \exp(C^{-1}(n - x))) \quad (19)$$

[Formula 12]

$$F(x, n)_{i,j} = \sum_k C_{i,k} \cdot (C_{k,j}^{-1}) \cdot \quad (20)$$

$$\exp\left(\sum_l C_{k,l}^{-1}(n_l - x_l)\right) / \left\{1 + \exp\left(\sum_l C_{k,l}^{-1}(n_l - x_l)\right)\right\}$$

It is desirable to implement the vector G and the Jacobi matrix which are noise components expressed by Expressions (19) and (20) above, respectively, in the cepstrum domain. When they are expressed in the log spectrum domain, they are expressed as Expressions (21) and (22) below, respectively.

[Formula 13]

$$F(x,n) = \{1 + \exp(x-n)\}^{-1} \quad (21)$$

[Formula 14]

$$G(x,n) = \log(1 + \exp(n-x)) \quad (22)$$

Next, referring to Expressions (17) to (20) above and setting what is obtained by differentiating the objective function Φ expressed by Expressions (15) and (16) above relative to a channel bias $c_d$, to 0, the current estimated value of the channel bias c is obtained. Furthermore, by updating the vector G and the Jacobi matrix F, which are noise components, using the current estimated value of the channel bias c, the objective function Φ is determined. Then, the channel bias c is estimated again so that the determined objective function Φ is minimized. By repeating the process including the two steps until the channel bias c converges, a final estimated value of the channel bias c is obtained.

By substituting the estimated value of the converged channel bias c into Expression (10), which is the generative model expression, and further approximating the third term on the right side of Expression (10) by MMSE estimation, Expression (23) below is obtained in the end. Clean speech of the target domain mapped from the source domain speech data can be obtained by Expression (23).

[Formula 15]

$$\hat{y} = y - c - \sum_{k}^{K} \rho_k(y) \cdot G(\mu_{\hat{y},k} + c, \mu_n) \quad (23)$$

In Expression (23), noise removal and channel characteristic compensation of the source domain are performed at the same time. If the noise of the source domain can be ignored, the noise removal may be omitted as in Expression (24) below.

[Formula 16]

$$\hat{y} = y - c \quad (24)$$

<Case of Taking Account of Channel Amplitude>

Here, description will be made on the case of newly introducing channel amplitude a in addition to the channel bias c in the generative model expression for mapping source domain speech data to the target domain speech data by the mapping parameter. In this case, the generative model expression of Expression (10) above is extended as Expression (25) below. In the expression, a signal * indicates a component-wise product.

[Formula 17]

$$y = a*\hat{y} + c + G(a*\hat{y} + c, n) \quad (25)$$

As described above, in embodiments of the present invention, the channel bias c and the channel amplitude a are estimated with the use of the VTS approximation and the EM algorithm. Specifically, the generative model expression expressed by Expression (25) above is referred to, and the channel bias c and the channel amplitude a included in the source domain GMM converted from the target domain GMM prepared in the Gaussian mixture model storage section 224 in advance are estimated with the use of the EM algorithm. That is, the step of determining acoustic likelihood obtained by inputting the feature vector y of the observed speech of the source domain into a source domain GMM converted from the target domain GMM and a step of determining the channel bias c and the channel amplitude a that minimize an objective function based on the determined acoustic likelihood are alternately repeated. Description will be made below with the use of numerical expressions.

Referring to the generative model expression of Expression (25) above, an average vector $\mu_{y,k}$ and a covariance matrix $\Sigma_{y,k,d}$ of a source domain GMM obtained from the target domain GMM prepared in advance by the VTS approximation on the assumption of a covariance diagonal matrix are as Expressions (26) and (27) below, respectively. An average vector and a covariance matrix of noise are indicated by $\mu_n$, and $\Sigma_{n,d}$, respectively, and Kronecker's delta is indicated by $\delta$, and G and F appearing in Expressions (26) and (27), respectively, are the vector G and the Jacobi matrix F which are noise components expressed by Expressions (19) and (20) above, respectively.

[Formula 18]

$$\mu_{y,k} \cong a*\mu_{\hat{y},k} + c + G(a*\mu_{\hat{y},k} + c, \mu_n) \quad (26)$$

[Formula 19]

$$\sum_{y,k,d} \cong \sum_{l} a_l^2 \cdot (\delta_{d,l} - F(a*\mu_{\hat{y},k} + c, \mu_n)_{d,l})^2 \cdot \sum_{y,k,d} + \sum_{l} F(a*\mu_{\hat{y},k} + c, \mu_n)_{d,l}^2 \cdot \sum_{n,l} \quad (27)$$

The objective function Φ is the same as the case of taking account only of the channel bias c and is expressed by Expressions (15) and (16) above. Therefore, referring to Expressions (19), (20), (26) and (27) above and setting what is obtained by differentiating the objective function Φ expressed by Expressions (15) and (16) above relative to the channel bias $c_d$, to 0, the current estimated value of the channel bias c is obtained. Similarly, referring to Expressions (19), (20), (26) and (27) above and setting what is obtained by differentiating the objective function Φ expressed by Expressions (15) and (16) above relative to a channel amplitude $a_d$, to 0, the current estimated value of the channel amplitude a is obtained. Next, by updating the vector G and the Jacobi matrix F, which are noise components, using the current estimated value of each of the channel bias c and the channel amplitude a, the objective function Φ is determined. Then, the channel bias c and the cannel amplitude a are estimated again so that the determined objective function Φ is minimized. By repeating the process including the two steps until the channel bias c and the channel amplitude a converge, final estimated values of the channel bias c and the channel amplitude a are obtained. The initial values of the channel bias c and the channel amplitude a can be a value 0 and a value 1, respectively. As for the channel bias c, all the components thereof are generally updated. However, as for the channel amplitude a, only low-order components, for example, only the 0-th and second components can be updated. This is because low-order components of cepstrum are dominant over the channel characteristic.

By substituting the estimated value of each of the channel bias c and the channel amplitude a which have converged, into Expression (25), which is a generative model expression, and further approximating the third term on the right side of Expression (25) by the MMSE estimation, Expression (28) below is obtained in the end. Clean speech of the target domain mapped from the source domain speech data can be obtained by Expression (28).

[Formula 20]

$$\hat{y} = a^{-1} * \left( y - c - \sum_{k}^{K} \rho_k(y) \cdot G(a*\mu_{\hat{y},k} + c, \mu_n) \right) \quad (28)$$

In Expression (28), noise removal and channel characteristic compensation of the source domain are performed at the same time. If the noise of the source domain can be ignored, the noise removal can be omitted as in Expression (29) below.

[Formula 21]

$$y = a^{-1}*(y-c) \quad (29)$$

<Case of Using GMM Prepared for Each Gender of Speakers>

In the two cases described above, the Gaussian mixture model storage section 224 includes one target domain GMM prepared in advance, which includes some speaker variation without distinction of gender. In another embodiment of the present invention, it is assumed that a target domain GMM is prepared for each gender of speakers. It is assumed that mapping to the target domain speech data is performed while masculinity and femininity for each utterance of source domain speech data received as an input is being determined. Then, the objective function $\Phi$ is expressed as Expression (30) below.

[Formula 22]

$$\Phi = E\left[\sum_d^D \sum_{g=f,m} \lambda_g \sum_k^K \rho_{g,k}(y) \cdot (y - \mu_{y,g,k})_d^2 \bigg/ \left(\sum_{y,g,k}\right)_d\right] \quad (30)$$

Here, g is a gender index and indicates any of female or male. Posterior gender probability $\lambda_g$ is what is obtained by performing normalization with Gaussian distribution likelihood regarded as posterior probability so that the total becomes 1. Furthermore, $\rho$ is posterior probability defined by Expression (16) above.

Here, it is assumed that the generative model expression of Expression (10) above and the objective function $\Phi$ of Expression (30) above are given. Then, referring to Expressions (17) to (20) above and setting what is obtained by differentiating the objective function $\Phi$ expressed by Expression (30) above relative to the channel bias $c_d$, to 0, the current estimated value of the channel bias c is obtained. Furthermore, by updating the vector G and the Jacobi matrix F, which are noise components, using the current estimated value of the channel bias c to determine the objective function $\Phi$. Then, the channel bias c is estimated again so that the determined objective function $\Phi$ is minimized. By repeating the process including the two steps until the channel bias c converges, a final estimated value of the channel bias c is obtained.

The posterior gender probability $\lambda_g$ is also updated as shown in Expressions (31) and (32) below on the basis of the posterior probability of the target domain GMM for each gender while the channel bias c is repeatedly updated.

[Formula 23]

$$\lambda_g' = E\left[\sum_k \gamma_{g,k} \cdot N\left(y; \mu_{y,g,k}, \sum_{y,g,k}\right)\right]_{4/5} \quad (31)$$

[Formula 24]

$$\lambda_g'' = \lambda_g' \bigg/ \sum_{g'} \lambda_{g'}' \quad (32)$$

The posterior gender probability $\lambda_g$ shown in Expression (33) below can be used as an option.

[Formula 25]

$$\lambda_g = \exp(\beta \cdot \lambda_g'') \bigg/ \sum_{g'} \exp(\beta \cdot \lambda_{g'}'') \quad (33)$$

The value of $\beta$ is a constant. Formulation has been performed on the assumption of the cepstrum domain. However, it is apparent to one skilled in the art that formulization can be similarly performed in the logarithmic mel spectrum domain or the logarithmic spectrum domain as often performed (the cepstrum domain refers to what is obtained by discrete cosine transform of the logarithmic mel spectrum domain).

Figure 4:
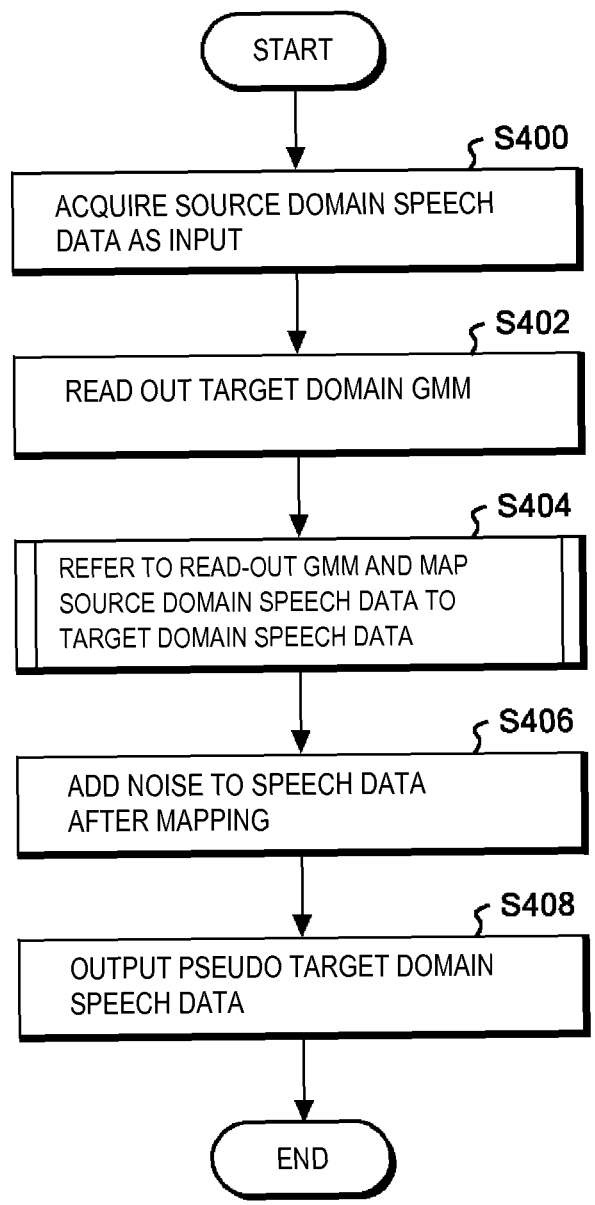
FIG. 4 is a flowchart showing an example of a whole flow of a training speech-data generation process according to embodiments of the present invention.

Next, the flow of the training speech-data generation process according to the embodiments of the present invention will be described with reference to FIGS. 4 and 5. FIG. 4 is a flowchart showing an example of the whole flow of the training speech-data generation process. FIG. 5 is a flowchart showing an example of the flow of a mapping process of step 404 in the flowchart shown in FIG. 4.

The flowchart shown in FIG. 4 starts at step 400, and the channel mapping section 226 acquires source domain speech data from the source domain data storage section 222 as an input. Next, the channel mapping section 226 reads out the target domain GMM from the Gaussian mixture model storage section 224 in step 402. Next in step 404, referring to the target domain GMM, the channel mapping section 226 maps the source domain speech data to the target domain speech data on the basis of the channel characteristic of the target domain speech data. The details of the mapping process will be described later with reference to FIG. 5.

Next in step 406, the noise adding section 230 adds noise randomly read out from the noise data storage section 228 to the speech data after the mapping to generate pseudo target domain speech data, and in step 408, outputs it to the target domain data storage section 232. Then, the process ends.

The flowchart shown in FIG. 5 starts at step 500, and the channel mapping section 226 determines a generative model expression indicating a relationship between the feature value vector of observed speech of the source domain and the feature value vector of observed speech of the target domain. As described above, there are two kinds of available generative model expressions: a generative model expression taking account only of the channel bias c as a channel mapping parameter, and a generative model expression taking account of the channel bias c and the channel amplitude as channel mapping parameters.

Next in step 502, the channel mapping section 226 estimates a channel mapping parameter included in a source domain GMM converted from the target domain GMM using the EM algorithm. Here, the source domain GMM is calculated from the target domain GMM prepared in advance and the generative model expression determined at step 500 by the VTS approximation as described above.

Next in step 504, the channel mapping section 226 maps the source domain speech data to the target domain speech data in accordance with the generative model expression determined at step 500, using the channel mapping parameter determined at step 502. Then, the process ends.

The present invention has been described with the use of an embodiment. However, the technical scope of the present invention is not limited to the range described in the above embodiment. It is apparent to one skilled in the art that various alterations or improvements can be made in the above embodiment. Therefore, embodiments in which such alterations or improvements have been made are naturally included in the technical scope of the present invention.

Each function of the embodiment described above can be realized by an apparatus-executable program written in C, C++, C#, an object-oriented programming language such as Java (registered trademark) or the like. The program of the present invention can be stored in an apparatus-readable recording medium such as a hard disk device, CD-ROM, MO, DVD, flexible disk, EEPROM and EPROM and distributed, or transmitted in a format readable by other apparatuses via a network.

Example

The present invention will be described more specifically below with the use of an example. However, the present invention is not limited to the example described below.

Computer programs for causing a computer to implement the method of the present invention disclosed before was prepared, and the performance of each computer program was evaluated with the use of a framework for evaluation of in-car speech recognition provided by a general incorporated association, Information Processing Society of Japan (IPSJ).

<Experimental Conditions>

The experiment was conducted with the use of an in-car speech recognition evaluation database CENSREC-3. Evaluation conditions were: a case where a remote microphone are used for both of training data and evaluation data without a mismatch (A); and a case where there is a mismatch that a close-talking microphone is used for training data and a remote microphone is used for evaluation data (B to E). Furthermore, the case where the mismatch exists (B to E) includes a case where the present invention is not applied (B), and a case where the present invention is applied (C to E). As for the case where the present invention is applied, the following three conditions were examined: a case where channel mapping taking account only of channel bias is applied to training data (C); a case where channel mapping taking account only of channel bias and distinguishing each gender of speakers is applied to training data (D); and a case where channel mapping taking account of channel bias and channel amplitude and distinguishing each gender of speakers is applied to training data (E).

When the present invention was applied, 3608 utterances by a total of 293 drivers including 202 men and 91 women recorded in parked automobiles were used as training data. As for the clean speech GMM of the target domain prepared in advance, the mixed number was 256, and training was performed with 500 pieces of utterance data recorded with remote microphones and selected randomly.

On the other hand, as evaluation data, 898 utterances by a total of 18 drivers including 8 men and 10 women recorded in parked automobiles were used.

Furthermore, a front-end which outputs various feature values required for the experiment was prepared and applied to both of the training data and the evaluation data. As for the feature value, the number of dimensions was 39 dimensions of MFCC 12 dimensions+ΔMFCC 12 dimensions+ΔΔMFCC 12 dimensions+logarithmic power, and a value was obtained for both of the case where CMN for each utterance is applied and the case where CMN for each utterance is not applied. The configuration of a back-end, such as how to create an acoustic model, was not changed (Category0).

<Result of Experiment>

FIG. 6 shows word accuracy (%) when CMN is on and off under each of the six conditions A to E described above. As for the condition A, since there is not a mismatch, the value of the word accuracy shows the upper limit. As for the condition B, since there is a mismatch, and channel mapping according to the present invention is not performed, the value shows a baseline. As for the conditions C to E, there is a mismatch, and channel mapping according to the present invention is applied. In any of the cases, the word accuracy is higher than the baseline. The value of the word accuracy under the condition D is improved in comparison with that of the condition C. Therefore, the channel mapping method according to the present invention can be effective for both of the channel characteristic and the speaker characteristic. Furthermore, since the value of the word accuracy when CMN is on is higher than that of the baseline, under all the conditions C to E, the channel mapping method according to the present invention can be compatible with CMN.

What is claimed is:

1. A method for generating training data for a target domain using speech data of a source domain, the training data generation method comprising:
   retrieving from a memory device a Gaussian mixture model (GMM) of a target domain trained with a clean speech data set of the target domain;
   retrieving a set of source domain speech data from a memory device that stores speech data under various acoustic environments;
   mapping, by referring to the GMM of the target domain and as executed by a processor on a computer, the set of source domain speech data to the set of target domain speech data on a basis of a channel characteristic of the target domain speech data;
   adding a noise of the target domain to the mapped set of source domain speech data to output a set of pseudo target domain speech data; and
   storing the set of pseudo target domain speech data in a memory, as training data for a speech model of the target domain,
   wherein a rate of noise to be added is adjusted for each of an utterance of the clean speech so that the rate of noise corresponds to a statistical distribution of a signal-to-noise (SN) ratio of the target domain.

2. The training data generation method according to claim 1, wherein the mapping the set of source domain speech data further comprises:
   determining a generative model expression for mapping the set of source domain speech data to the set of target domain speech data by a channel mapping parameter; and
   estimating the channel mapping parameter included in a source domain GMM converted from the GMM of the target domain by referring to the generative model expression, using an Expectation Maximization (EM) algorithm.

3. The training data generation method according to claim 2, wherein the channel mapping parameter comprises:
   a channel bias to be subtracted from the set of source domain speech data in order to determine the set of pseudo target domain speech data.

4. The training data generation method according to claim 3, wherein the channel mapping parameter further comprises:
   a channel amplitude by which the set of source domain speech data is multiplied to determine the set of pseudo target domain speech data.

5. The training data generation method according to claim 2, wherein estimating using the EM algorithm comprises:
   alternately determining an acoustic likelihood obtained by inputting an observed value of the source domain into the converted source domain GMM; and
   determining the channel mapping parameter that minimizes an objective function based on the acoustic likelihood.

6. The training data generation method according to claim 5, wherein a noise component calculated on the basis of the channel mapping parameter currently estimated is used in the step of determining the acoustic likelihood.

7. The training data generation method according to claim 6, wherein a Vector Taylor Series (VTS) approximation is used when determining the source domain GMM converted from the GMM of the target domain by using the generative model expression.

8. The training data generation method according to claim 2, wherein:
the GMM of the target domain trained is prepared for a male speaker and a female speaker; and
the set of target domain speech data mapping is performed while masculinity and femininity is determined for an utterance from the set of source domain speech data received as the input.

9. The training data generation method according to claim 1, wherein mapping the set of source domain speech data further comprises:
determining, for each set of source domain speech data, a difference from an average of Gaussian distribution components which are near to the set of source domain speech data in an acoustic space, among Gaussian distribution components of the GMM of the target domain;
determining the difference as a time-direction average after weighting the difference with a likelihood of each Gaussian distribution component; and
adding the difference to the set of source domain speech data.

10. A non-transitory memory device tangibly embodying a set of computer-readable instructions for causing a computer to execute each step of the training data generation method according to claim 1.

11. A training data generation system adapted to execute steps of the training data generation method according to claim 1, said training data generation system comprising:
a central processing unit (CPU);
an external storage device; and
a read only memory (ROM),
wherein the external storage device and ROM store instructions for causing the CPU to execute the training data generation method.

12. A system for generating training data for a target domain using a set of speech data of a source domain, the training data generation system comprising:
a memory;
a processor communicatively coupled to the memory; and
a feature selection module communicatively coupled to the memory and the processor, wherein the feature selection module is configured as a set of computer-readable instructions to instruct the processor to perform a method comprising:
reading out a Gaussian mixture model (GMM) of a target domain trained with a clean speech data set of the target domain;
mapping, by referring to the GMM of the target domain, a set of source domain speech data received as an input to the set of target domain speech data on a basis of a channel characteristic of the target domain speech data;
adding a noise of the target domain to the mapped set of source domain speech data to output a set of pseudo target domain speech data, and
storing the set of pseudo target domain speech data as training data for a speech model of the target domain.

13. The training data generation system according to claim 12, wherein mapping the set of source domain speech data further comprises:

determining a generative model expression for mapping the set of source domain speech data to the set of target domain speech data by the channel mapping parameter; and
estimating the channel mapping parameter included in a source domain GMM converted from the GMM of the target domain by referring to the generative model expression, using an Expectation Maximization (EM) algorithm.

14. The training data generation system according to claim 13, wherein the channel mapping parameter comprises:
a channel bias to be subtracted from the set of source domain speech data and a channel amplitude by which the set of source domain speech data is to be multiplied in order to determine the set of pseudo target domain speech data.

15. The training data generation system according to claim 12, wherein the noise comprises noise added randomly from a noise data storage section storing noise at the target domain which is mixed into a microphone from a sound source other than speech and which noise is recorded at the target domain under a same acoustic environment as an acoustic environment at a time of training the GMM model from the clean speech data.

16. The training data generation method according to claim 1, wherein the noise comprises noise added randomly from a noise data storage section.

17. A method, comprising:
retrieving, from a memory device, a data set of clean speech of a target domain;
training, as executed by a processor on a computer, a Gaussian mixture model (GMM) of the target domain, as trained with the clean speech data set of the target domain;
mapping, by referring to the GMM of the target domain, a set of source domain speech data received as an input to the set of target domain speech data on a basis of a channel characteristic of the target domain speech data;
adding a noise of the target domain to the mapped set of source domain speech data to output a set of pseudo target domain speech data; and
storing, in a target domain data storage device, the set of pseudo target domain speech data as training data for a model in the target domain,
wherein a rate of noise to be added is adjusted for each of an utterance of the clean speech so that the rate corresponds to a statistical distribution of a signal-to-noise (SN) ratio of the target domain.

18. The method according to claim 17, the noise comprising noise added randomly from a noise data storage section storing noise at the target domain, as mixed into a microphone from a sound source other than speech and recorded at the target domain under a same acoustic environment as at a time of training the GMM model from the clean speech data.

19. The method according to claim 17, wherein the target domain comprises speech data on the Internet, the method thereby simulating speech data of the target domain by reusing abundantly existing speech data under different acoustic environments.

20. The method according to claim 1, wherein the target domain comprises a speech search using Internet services.

* * * * *